United States Patent [19]
Iwata et al.

[11] Patent Number: 5,109,820
[45] Date of Patent: May 5, 1992

[54] APPARATUS AND METHOD FOR CONTROLLING KNOCKING IN AN INTERNAL COMBUSTION ENGINE

[75] Inventors: Toshio Iwata; Atsuko Matsuoka; Atsuko Hashimoto, all of Himeji, Japan

[73] Assignees: Mitsubishi Denki K.K.; Mitsubishi Jidosha Kogyo K.K., both of Tokyo, Japan

[21] Appl. No.: 690,245

[22] Filed: Apr. 24, 1991

[30] Foreign Application Priority Data

Apr. 26, 1990 [JP]  Japan .................................. 2-108637

[51] Int. Cl.$^5$ .............................................. F02P 5/14
[52] U.S. Cl. .................................... 123/425; 123/435
[58] Field of Search ............................ 123/425, 435; 364/431.03, 431.05, 431.08

[56] References Cited

U.S. PATENT DOCUMENTS

| | | | |
|---|---|---|---|
| 4,750,103 | 6/1988 | Abo et al. | 364/431.08 |
| 4,760,828 | 8/1988 | Shimada et al. | 123/425 |
| 4,766,545 | 8/1988 | Nagai | 364/431.08 |
| 4,770,144 | 9/1988 | Sakakibara et al. | 123/425 |
| 4,882,695 | 11/1989 | Mieno et al. | 364/431.08 |
| 4,892,074 | 1/1990 | Iriyama | 123/425 |
| 4,951,630 | 8/1990 | Iwata | 123/435 |
| 4,969,440 | 11/1990 | Murakami et al. | 123/425 |
| 4,993,387 | 2/1991 | Sakakibara et al. | 123/425 |

Primary Examiner—Raymond A. Nelli
Attorney, Agent, or Firm—Sughrue, Mion, Zinn, Macpeak & Seas

[57] ABSTRACT

A knock control apparatus and method for an internal combustion engine serves to simplify hardware components employed to reduce the load thereon, and hence minimize the cost of manufacture while improving the freedom of control of an engine control unit. Vibrations of a cylinder are sensed to generate a vibration level which is then averaged to provide an average value. A knock determination threshold is generated based on the average value. The vibration level is compared with the threshold for determining whether knock is taking place in the cylinder. When the vibration level exceeds the threshold, engine control parameters are controlled in a direction to suppress knocking in the cylinder. Preferably, the averaging of the vibration level comprises averaging the vibration level to provide a first average value, and averaging the first average value to provide a second average value. Preferably, the generation of a vibration level comprises generating a first vibration level and a second vibration level at a first and a second reference crank position, respectively. A knock determination threshold is generated based on the second vibration level. A knock determination signal is generated based on a difference between the first vibration level and the knock determination threshold.

14 Claims, 6 Drawing Sheets

APPARATUS AND METHOD FOR CONTROLLING KNOCKING IN AN INTERNAL COMBUSTION ENGINE

BACKGROUND OF THE INVENTION

The present invention relates to an apparatus and a method for controlling knocking in an internal combustion engine such as an automotive gasoline engine which detects knock in the engine and controls various engine control parameters in a direction to suppress the knocking. More particularly, it relates to such a knock control apparatus and method which is able to improve knock control and reduce the cost of manufacture thereof.

In general, in an internal combustion engine such as an automotive gasoline engine having a plurality of cylinders, the air/fuel mixture in each cylinder is compressed and fired at an optimum ignition point so as to produce maximum output power without incurring knocking. To properly control the operations of the respective cylinders, it is common practice to employ a microcomputer which controls the ignition timing, the fuel injection order, the fuel injection timing and the like for the respective cylinders in an optimal manner.

Among engine control parameters such as the amount of fuel injected into each cylinder, ignition timing, etc., if ignition timing is controlled to be excessively advanced for example, engine vibrations called knocking are caused by abnormal combustion of the air/fuel mixture in a cylinder, and the cylinder may be damaged or destructed. In order to avoid such a situation, when abnormal engine vibrations are detected by a sensor, engine control parameters should be controlled in a sense to suppress knocking. For example, the ignition timing for the cylinder that is knocking is retarded or the amount of fuel to be injected into the knocking cylinder is decreased.

FIG. 7 shows a block diagram of a conventional knock control apparatus for an internal combustion engine. In this figure, the apparatus illustrated comprises a knock sensor 1 in the form of an acceleration sensor and the like installed on an engine for sensing knocking in the engine, e.g., for sensing vibrational accelerations of the cylinders due to knocking and generating a corresponding electrical output signal A, a knock detecting circuit 2 for identifying signals due to the knocking in the output signal of the knock sensor 1 and generating an output signal $V_R$ in an analog form when knocking is detected, an analog to digital (A/D) converter 3 for converting the analog output signal of the knock detecting circuit 2 into a digital signal, and an engine control unit 4 (hereinafter referred to as an ECU) in the form of a microcomputer including an ignition timing controller 5 connected to receive the digital signal from the A/D converter 3 for controlling the ignition timing of the engine in an appropriate manner so as to suppress knocking in the engine. The knock detecting circuit 2 includes a band-pass filter 22 for filtering a particular frequency band of the output signal A of the knock sensor 1, a gate circuit 23 operable, through the action of a mask signal M from the ECU 4, to pass specific portions of the output signal of the band-pass filter 22, a BGL circuit 24 connected to receive the output signal of the gate circuit 23 for generating an output signal A′ of a background level, a comparator 25 having a first input terminal connected to receive the output signal A′ of the gate circuit 23 and a second input terminal which is supplied with the output signal of the BGL circuit 24 for making a comparison between these input signals, and an integrator 26 having an input terminal coupled to the output terminal of the comparator 25 and an output terminal coupled to the input terminal of the A/D converter 3 for integrating the output signal of the comparator 25 and outputting an analog signal to the A/D converter 3, the integrator 26 further having a reset terminal coupled to the ECU 4 such that it is reset by a reset signal R from the ECU 4.

FIG. 8 shows in diagrammatic form the waveforms of the output signal A of the knock sensor 1, the mask signal M, the gate circuit output signal A′, the BGL signal and the integrator output signal $V_R$, respectively, of the knock control apparatus of FIG. 7.

The conventional knock control apparatus as constructed above operates as follows. First, the knock sensor 1 generates an output signal which is input to the band-pass filter 22 where a specific frequency band thereof is filtered and passed to the gate circuit 23. The gate circuit 23, which has a gate control terminal supplied from the ECU 4 with a mask signal R containing square pulses occurring at predetermined intervals, operates to mask the output signal of the knock sensor 1 as filtered through the band-pass filter 2 in such a manner that those portions of the knock sensor output signal A which correspond to the respective square pulses of the mask signal M are removed to provide an output signal which contains no pulse at locations corresponding to the respective square pulses of the mask signal M. The output signal of the gate circuit 23 is input to the first input terminal of the comparator 25, and at the same time it is imposed on the input terminal of the BGL circuit 24 so that the BGL circuit 24 produces an output signal having a predetermined background voltage level. The background level voltage of the BGL circuit 24 is imposed on the second input terminal of the comparator 25 and compared with the output signal of the gate circuit 23 fed to the first input terminal of the comparator 25, so that the comparator 25 generates an output signal when the output signal of the gate circuit 23 is higher than the background voltage level. The output signal of the comparator 25 is fed to the integrator 26 which performs integration to generate an output signal, as shown in FIG. 8. In this regard, it is to be noted that although not illustrated in FIG. 7, in case of a multi-cylinder internal combustion engine, a plurality of knock sensors 1 are employed one for each engine cylinder, and the output signals of the respective knock sensors 1 are fed to the integrator 26 in a parallel relation with each other through the band-pass filter 22, the gate circuit 23 and the comparator 25 so that they are respectively integrated by the integrator 26 to provide corresponding output signals. To this end, the ECU 4 feeds a reset signal for each knock sensor output to the reset terminal of the integrator 26 at an appropriate timing. The integrated output signal of the analog form of the integrator 26 is then fed to the A/D converter 3 and converted there into a digital signal $V_R$ which, in turn, is read into the ECU 4 where, based on the digital signal $V_R$, the ignition timing controller 5 successively calculates an appropriate knock-suppression retard angle $_R$ using the following formula;

$$\theta_R = \theta_R^* + \Delta\theta_R \tag{1}$$

where $\theta_R^*$ is the last knock-suppression retard angle, and $\Delta\theta_R$ is expressed as follows:

$$\Delta\theta_R = V_R \times L$$

where L is a modification coefficient.

With the above-mentioned conventional knock control apparatus, however, the knock detecting circuit 2, which is a hardware component, includes a knock determining means comprising the BGL circuit 24, the comparator 25 and the integrator 26 for determining whether or not there is knocking in the engine. Such a knock determining processing requires a rather complicated circuit arrangement and besides puts a tremendous load on the controlling hardware, resulting in high manufacturing costs.

SUMMARY OF THE INVENTION

Accordingly, the present invention is intended to obviate the above-mentioned problems of the conventional knock control apparatus.

An object of the present invention is to provide a novel and improved knock control apparatus and method for an internal combustion engine which is able to simplify hardware components employed to reduce the load thereon, and hence are low in the cost of manufacture while improving the freedom of control of an engine control unit.

In order to achieve the above object, according to one aspect of the present invention, there is provided a knock suppression apparatus for an internal combustion engine comprising:

a knock sensor for sensing knock in a cylinder;

a signal processor for generating, based on the output signal of the knock sensor, a vibration level for a predetermined crank angle range from a reference crank position of the cylinder;

filter means generating an average value of the vibration level;

a calculator for providing a knock determination threshold based on the average value;

a comparator for comparing the vibration level with the knock determination threshold and generating a knock determination signal when the vibration level exceeds the knock determination threshold; and a knock controller for controlling, based on the knock determination signal, engine control parameters in a direction to suppress knocking in the cylinder.

Preferably, the filter means comprises:

a first filter for averaging the vibration level to provide a first average value; and a second filter for averaging the first average value to provide a second average value.

Preferably, the signal processor generates a first vibration level and a second vibration level at a first and a second reference crank position, respectively. The calculator generates a threshold based on the second vibration level. The comparator generates a knock determination signal based on a difference between the first vibration level and the threshold which is generated by the calculator based on the second vibration level.

According to another aspect of the present invention, there is provided a knock control method for suppressing a knock in an internal combustion engine, the method comprising the steps of:

generating a vibration level representative of vibrations of a cylinder of the engine;

averaging the vibration level to provide an average value;

generating a knock determination threshold based on the average value;

comparing the vibration level with the threshold for determining whether knock is taking place in the cylinder; and controlling engine control parameters in a direction to suppress knocking in the cylinder when the vibration level exceeds the threshold.

The above and other objects, features and advantages of the present invention will become apparent from the following detailed description of a few preferred embodiments of the invention taken in conjunction with the accompanying drawings.

DESCRIPTION OF THE PREFERRED EMBODIMENTS

The present invention will now be described in detail with reference to a few preferred embodiments thereof as illustrated in the accompanying drawings.

Figure 1:
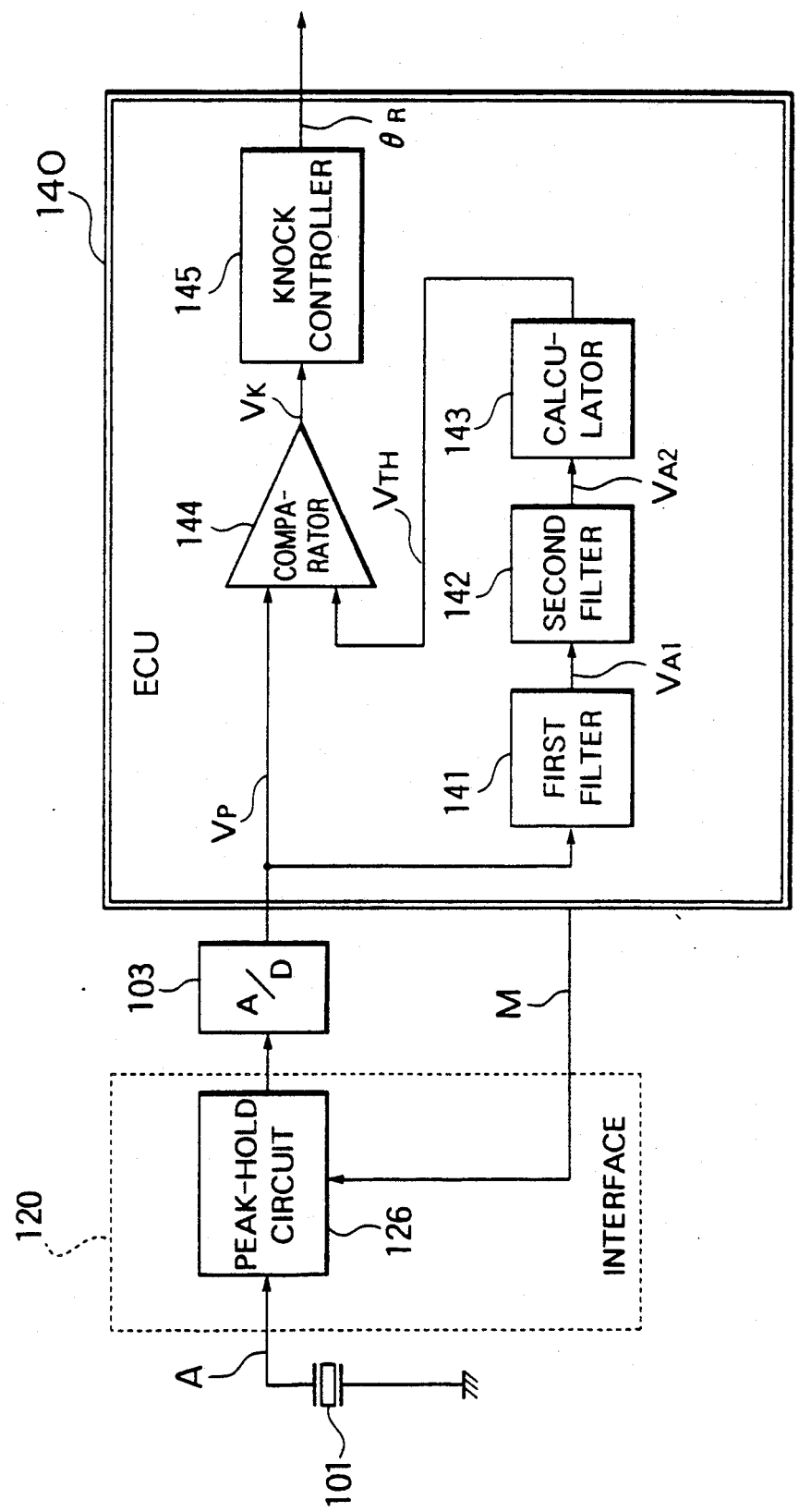
FIG. 1 is a schematic block diagram of a knock control apparatus for an internal combustion engine in accordance with one embodiment of the present invention.

Referring to the drawings and first to FIG. 1, there is shown the general arrangement of a knock control apparatus for an internal combustion engine constructed in accordance with one embodiment of the present invention. The knock control apparatus illustrated includes knock sensors 101 (only one is illustrated) each in the form of an acceleration or vibration sensor, etc., an interface circuit 102 in the form of a signal processor, an A/D converter 103, and an engine control unit (ECU) 140.

Figure 2:
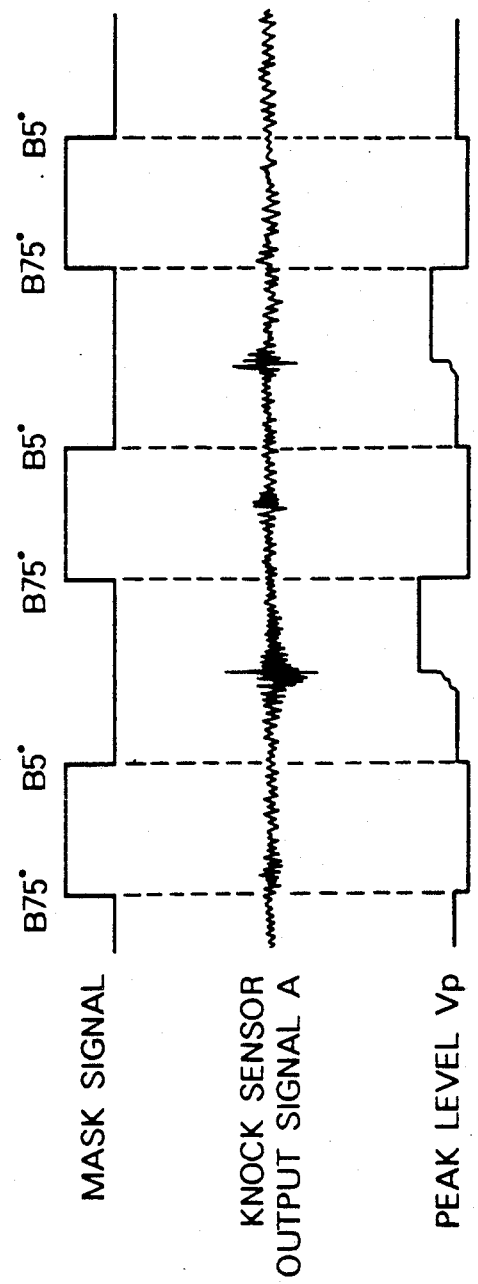
FIG. 2 is a waveform diagram showing the waveforms of a mask signal M, a knock sensor output signal A and a peak level signal $V_P$, respectively, of the apparatus of FIG. 1 for explaining the operation thereof.

The knock sensors 101 are each installed on a cylinder of an internal combustion engine for sensing vibrations of the cylinder and generating an output signal A of high frequencies, as illustrated in FIG. 2.

The interface circuit 102 is interposed between the knock sensors 101 and the A/D converter 103 and it receives the output signals A of the knock sensors 101 and successively generates an output signal representative of the level of cylinder vibrations during each prescribed period with respect to a prescribed reference crank position of each cylinder. In this case, the interface circuit 102 comprises a peak-hold circuit 126 which outputs a peak level signal $V_P$ representative of the varying peak level of the knock sensor output signal A during each period which ranges, for example, from 5 degrees BTDC of an engine cycle to 75 degrees BTDC of the following engine cycle, as shown in FIG. 2. Specifically, a mask signal M, which contains rectangular pulses each rising, for example, at 75 degrees BTDC and falling at 5 degrees BTDC as shown in FIG. 2, is generated by the ECU 140 in synchronism with the rotation of the engine and fed to the peak-hold circuit 126. Thus, the peak-hold circuit 126 outputs the peak level $V_p$ of the knock sensor output signal A at each first reference crank position (e.g., at 75 degrees BTDC) to the ECU 140 via the A/D converter 103.

The ECU 140 comprises a first filter 141 for averaging the A/D converted peak level $V_p$ to provide a first average value $V_{A1}$ corresponding to a first background level (BGL), a second filter 142 for averaging the first average value $V_{A1}$ for every predetermined period to provide a second average value $V_{A2}$ corresponding to a second BGL, a calculator 143 for generating a knock determination threshold $V_{TH}$ based on the second average value $V_{A2}$, a comparator 144 for comparing the peak level $V_p$ with the knock determination threshold $V_{th}$ and generating an output signal in the form of a knock determination signal of differential type when the peak level $V_p$ exceeds the knock determination threshold $V_{th}$, and a knock controller 145 for generating a knock control signal in the form of an ignition-retarding control signal R based on the knock determination signal $V_K$. Among the above elements, the first and second filters 141, 142 constitute a filter means for providing the average of the vibration level in the form of the peak level $V_p$. In this embodiment, the filter means is of a two-staged structure including the first and second filters 141, 142, and the calculator 143 generates the knock determination threshold $V_{TH}$ based on the second average value $V_{A2}$ from the second filter 142. If, however, the averaging of the peak level $V_p$ is sufficiently performed in a single stage or by the use of a single filter (i.e., the first filter 141), the second filter 142 can be omitted so that the knock determination threshold $V_{TH}$ is provided based on the first average value $V_{A1}$ from the first filter 141.

Figure 3:
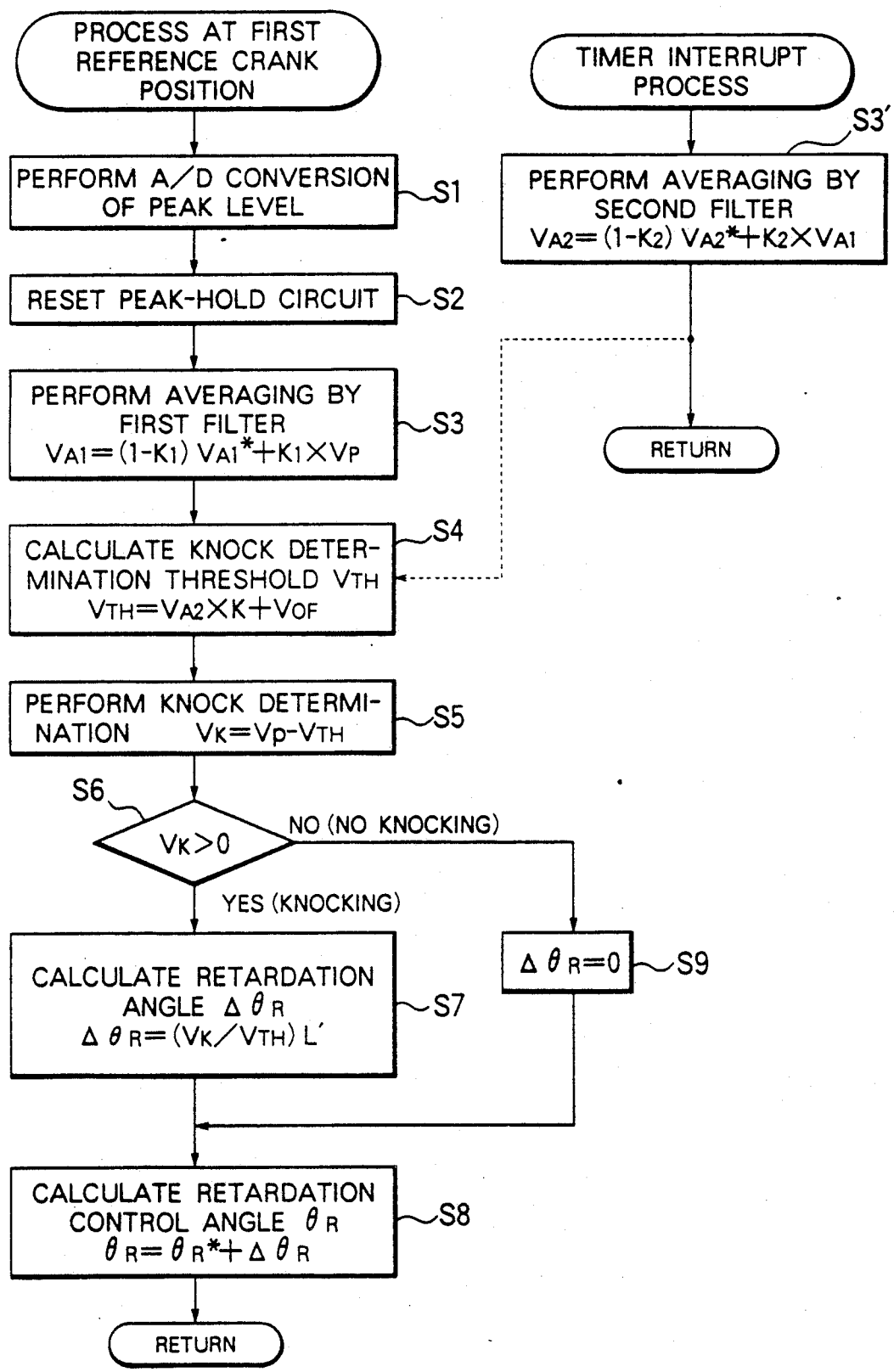
FIG. 3 is a flow chart showing the operation of the knock control apparatus of FIG. 1.

The operation of the above embodiment as well as a knock control method using it will now be described in detail while referring to the waveform diagram of FIG. 2 and the flow chart of FIG. 3. First, in Step S1, each knock sensor 101 senses the vibrations of a corresponding cylinder and generates a corresponding output signal A, whose peak level $V_p$ is fed through the A/D converter 103 to the ECU 140 upon every ignition of the cylinder. Specifically, the peak-hold circuit 126 holds the peak level of the knock sensor output signal A during a prescribed period of each engine cycle (e.g., a crank angle range from 5 degrees BTDC of an engine cycle to 75 degrees BTDC of the following engine cycle), which is converted by the A/D converter 103 from analog into digital form and then input to the ECU 140.

Then, in Step S2, the ECU 140 samples the peak level $V_p$ at a first reference crank position of 75 degrees BTDC for example, and generates a mask signal M containing rectangular pulses each of which rises at the first reference crank position (e.g., 75 degrees BTDC) of an engine cycle and falls at a second reference crank position (e.g., 5 degrees BTDC) of the following engine cycle which comes after the lapse of the prescribed period from the first reference crank position. The mask signal M thus generated is input to the peak-hold circuit 126 which is reset at the rising edge of each pulse of the mask signal M. The peak-hold circuit 126 is held reset as long as the mask signal M is on or at a high level, and begins to operate at the falling edge of each pulse of the mask signal M, e.g., at the second reference crank position of 5 degrees BTDC, so that the ECU 140 is repeatedly operated to start a processing routine of FIG. 3 by the peak level signal $V_p$ at every first reference crank position (e.g., 75 degrees BTDC).

As illustrated in FIG. 2, the peak level $V_p$ of the knock sensor output signal A obtained at every first reference crank position of a cylinder changes in accordance with variations in the knock sensor output signal A for each sampling cycle. Though the variations in the knock sensor output signal A are caused by knocking in the cylinder and noise as well, a background level, which follows changes in the peak level $V_p$ to some extent, is required for accurately detecting knocking since the peak level $V_p$ varies with time under various conditions.

To this end, in Step S3, the first filter 141 averages the peak level $V_p$ at the first reference crank position of 75 degrees BTDC to provide a first average value $V_{A1}$ using the following formula:

$$V_{A1} = (1-k_1) \times V_{A1}^* + k_1 \times V_p \qquad (2)$$

where $V_{A1}^*$ is the last value of the first average, and $k_1$ is a constant representative of the rate of contribution of the peak level $V_p$ in the averaging processing. In this regard, $k_1$ can be set to an arbitrary value within the range of $0 < k_1 < 1$.

According to formula (2) above, the first average $V_{A1}$ shifts to a value which is the last-calculated first average $V_{A1}^*$ modified by the present peak level $V_p$, and hence it is successively updated. The constant $k_1$ for determining the rate of contribution of the peak level $V_p$ is set to ⅛ for example, but in order to provide faster or quicker followability of the level shift of the first average $V_{A1}$, the constant $K_1$ is set to a value greater than ⅛.

On the other hand, the second filter 142 executes a timer interrupt process for each prescribed period of time. Specifically, in Step S3', the first average $V_{A1}$, which was obtained by the first filter 141, is further averaged to provide a second average $V_{A2}$ using the following formula:

$$V_{A2} = (1-k_2) \times V_{A2}^* + k_2 \times V_{A1} \qquad (3)$$

where $V_{A2}^*$ is the last-calculated second average, and $k_2$ is a constant which is representative of the rate of contribution of the first average $V_{A1}$ in the averaging processing, and which can be set to an arbitrary value within the range of $0 < k_2 < 1$.

According to formula (3) above, the second average $V_{A2}$ shifts to a value which is the last-calculated second average $V_{A2}^*$ modified by the present first average $V_{A1}$, and thus it is successively updated. With this averaging processing step S3', the second average $V_{A2}$ becomes a value which does not substantially contribute to variations in the peak level $V_p$.

Subsequently, in Step S4, in the processing routine performed at 75 degrees BTDC, the calculator 143 amplifies the second average $V_{A2}$ and adds an offset $V_{OF}$ to it to provide a threshold $V_{TH}$, which is finally used for knock determination, using the following formula:

$$V_{TH} = K \times V_{A2} + V_{OF} \tag{4}$$

where K is a coefficient of amplification. In this case, since the second average $V_{A2}$ is sufficiently smoothed, a change in the variations of the threshold $V_{TH}$ between successive engine cycles as obtained by formula (4) above is substantially suppressed, thus providing a reliable value.

Then, in Step S5, for comparison between the peak level $V_p$ and the threshold $V_{TH}$, the comparator 144, which acts as a knock detecting means, calculates a difference Vk therebetween ($Vk = V_p - V_{TH}$). Thereafter, in Step S6, it is determined whether the difference Vk is positive.

Subsequently, when the peak level $V_p$ exceeds the threshold $V_{TH}$ (i.e., Vk>0), a knock determination signal $V_K$ representative of an occurrence of knocking is generated. In this case, the program goes to Step S7 where the knock controller 145 calculates an angle of retardation $\Delta\theta_R$ required for knock suppression control using the following formula:

$$\Delta\theta_R = (Vk/V_{TH}) \times L' \tag{5}$$

where L' is a coefficient of modification. In this case, since the angle of retardation $\Delta\theta_R$ is calculated based on the ratio of the knock determination signal Vk to the threshold $V_{TH}$, as seen from formula (5) above, an appropriate value for the retardation angle $\Delta\theta_R$ is always obtained even if there is a variation in the vibration level $V_p$.

Then, in Step S8, based on the angle of retardation $\Delta\theta_R$ thus obtained, an appropriate retardation control angle $\theta_R$ for retarding the ignition point in a direction to suppress knocking is calculated using the following formula described before:

$$\theta_R = \theta_R^* + \Delta\theta_R \tag{1}$$

where $\theta_R^*$ is the last retardation control angle.

On the other hand, if it is determined to be Vk≦0 in Step S6, the program goes to Step S9 where there is no knock determination signal Vk generated, and from formula (5) above, the angle of retardation $\Delta\theta_R$ becomes equal to zero. Therefore, in this case, the retardation control angle $\theta_R$ remains unchanged.

Based on the retardation control angle $\theta_R$ obtained in this manner, the ignition position for a knocking cylinder is corrected to change or move in the ignition retarding direction so as to suppress knocking.

According to this embodiment, only the peak-hold circuit 126 comprises a hardware component and all the other components of the knock determination means are included as software in the electronic control unit (ECU) 140, so the degree of freedom in controllability is very much improved. In this manner, the load on the hardware component is substantially alleviated, thus making it possible to reduce the cost of manufacture.

Although in the above embodiment, the comparator 144 outputs the difference between the peak level $V_P$ and the threshold $V_{TH}$ as a knock determination signal Vk, it can be simply constructed such that an output signal of a high level is generated when the vibration level $V_P$ exceeds the threshold $V_{TH}$.

Figure 7:
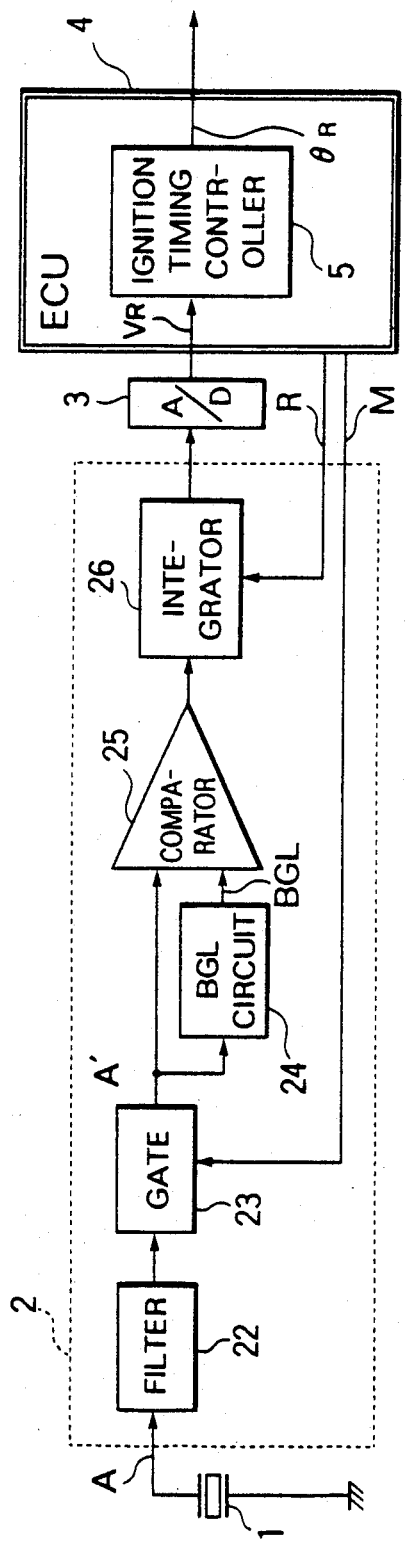
FIG. 7 is a schematic block diagram of a conventional knock control apparatus.
Figure 8:
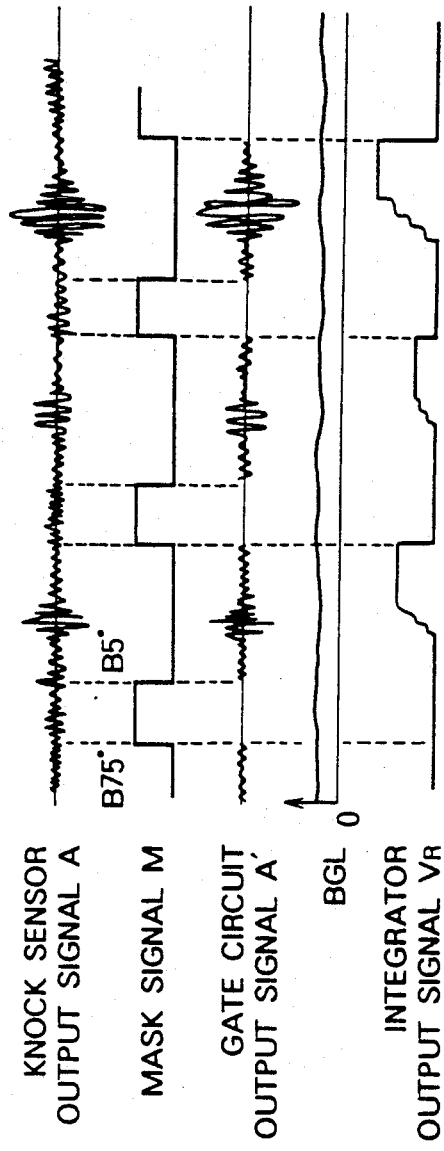
FIG. 8 is a waveform diagram showing the waveforms of a knock sensor output signal A, a mask signal M, a gate circuit output signal A', a BGL signal and an integrator output signal $V_R$, respectively, of the knock control apparatus of FIG. 7 for explaining the operation thereof.

Moreover, although in the above embodiment, the interface circuit 120 for generating a vibration level comprises the peak-hold circuit 126 which outputs a peak level $V_P$, it may comprise an integrator 25 as employed by the conventional apparatus of FIG. 7.

Figure 4:
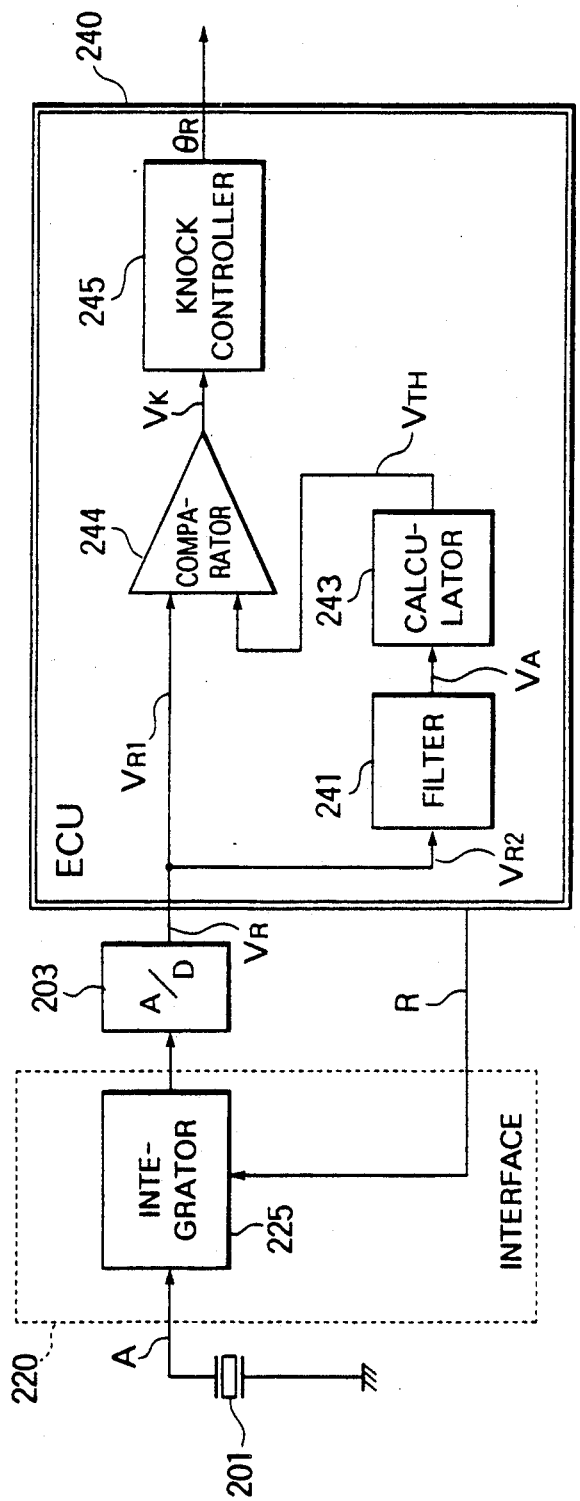
FIG. 4 is a schematic block diagram of a knock control apparatus for an internal combustion engine in accordance with another embodiment of the present invention.

FIG. 4 diagrammatically shows another embodiment of the present invention in which an integrator is employed for generating a vibration level in the form of an integrated value $V_R$.

In FIG. 4, an interface circuit 220 includes an integrator 225 for integrating the output signal A of a knock sensor 201, and it outputs, at predetermined first and second reference crank positions of each cylinder which are generated by an unillustrated signal generator in synchronism with the rotation of the engine, an analog-to-digital converted, integrated value $V_R$, which is the value calculated by the integrator 225 just before the resetting thereof by a reset signal R from the ECU 240.

The ECU 240 includes a filter 241 for averaging the integrated value $V_{R2}$ calculated at the second reference crank position (e.g., 5 degrees BTDC), a calculator 243 for generating a threshold $V_{TH}$ based on the average value $V_A$ from the filter 241, a comparator 244 for comparing an integrated value $V_{R1}$, which is calculated at the first reference crank position (e.g., 75 degrees BTDC), with the threshold $V_{TH}$, and a knock controller 245 for generating a retardation control angle $\theta_R$ based on the knock determination signal Vk from the comparator 244.

The operation of the above embodiment of FIG. 4 and a knock control method carried out by this embodiment will now be described in detail while referring to the waveform diagram of FIG. 5 and the flow chart of FIG. 6.

Figure 5:
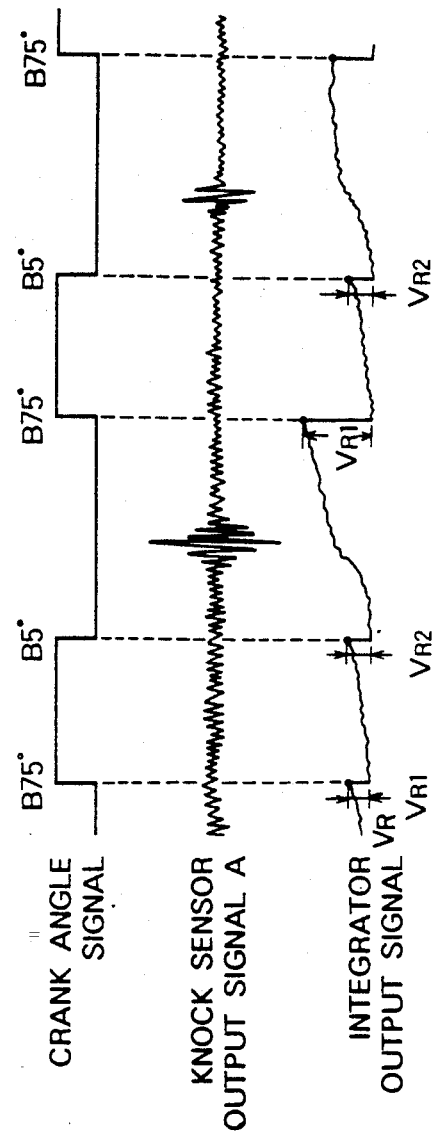
FIG. 5 is a waveform diagram showing the waveforms of a crank angle signal, a knock sensor output signal A and an integrator output signal $V_R$, respectively, of the knock control apparatus of FIG. 4 for explaining the operation thereof.
Figure 6:
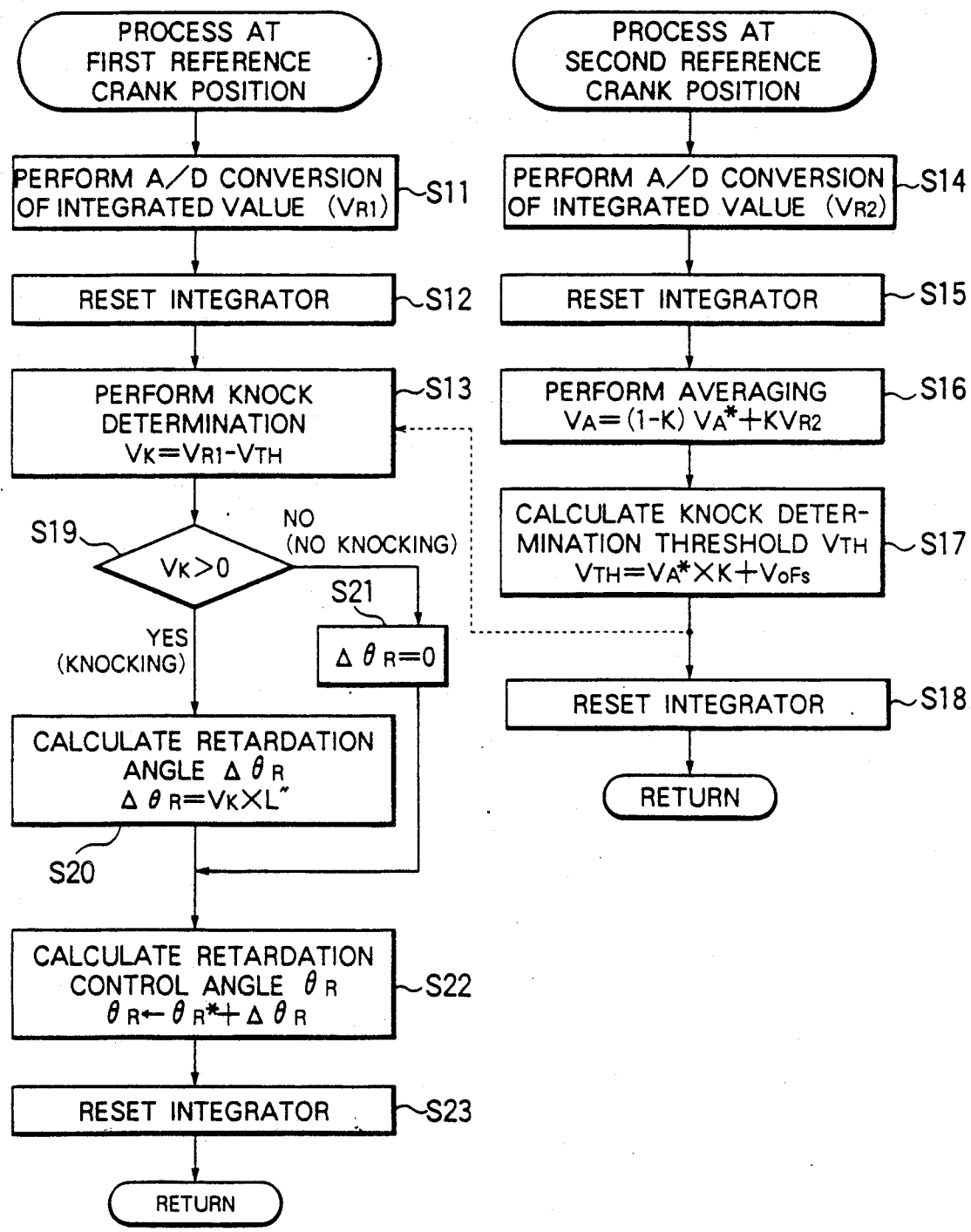
FIG. 6 is a flow chart showing the operation of the knock control apparatus of FIG. 4.

As shown in FIG. 5, the output signal A of each knock sensor 201 is integrated by the integrator 225 to provide an integrated value which is input, at a time just before a reset signal R is input from the ECU 240 to the integrator 225, to the ECU 240 as a first integrated value $V_{R1}$ at the first reference crank position (e.g., 75 degrees BTDC) and a second integrated value $V_{R2}$ at the second reference crank position (e.g., 5 degrees BTDC).

Based on the respective integrated values $V_{R1}$, $V_{R2}$, the ECU 240 performs a knock determination processing and a retardation angle correction processing for knock suppression. Specifically, as shown in FIG. 6, the respective processings are performed at the predetermined first and second reference crank positions (e.g., 75 degrees BTDC and 5 degrees BTDC) of each cylinder which an unillustrated signal generator generates in synchronism with the rotation of the engine.

First, in Step S11, in the processing routine performed at the first reference crank position (e.g., 75 degrees BTDC), the output of the integrator 225 is converted from analog to digital form to provide a first integrated value $V_{R1}$ at the first reference crank position (e.g., 75 degrees BTDC).

In Step S12, the integrator 225 is reset by a reset signal R from the ECU 240, and then in Step S13, the comparator 244 compares the first integrated value $V_{R1}$ with the threshold $V_{TH}$ and obtains a knock determination signal Vk using the following formula:

$$Vk = V_{R1} - V_{TH}$$

Here, it is to be noted that another processing performed at the second reference crank position (e.g., 5 degrees BTDC) for obtaining the threshold $V_{TH}$ will be described later.

Subsequently, in Step S19, the comparator 244 determines whether the knock determination signal Vk is greater than zero. If the answer is "YES" (i.e., there is knocking), the ignition controller 245 calculates an angle of retardation $\Delta\theta_R$ in Step S20 and then a retardation control angle $\theta_R$ in Step S22 from the following formulae:

$$\Delta\theta_R = Vk \times L''$$

$$\theta_R = \theta_R^* + \Delta\theta_R$$

where $L''$ is a coefficient of modification.

Immediately after the knock controller 244 has performed a knock control operation based on the retardation control angle $\theta_R$ thus obtained, the integrator 225 is reset by a reset signal R fed thereto from the ECU 240 in Step S23.

In this regard, the calculation of the angle of retardation $\Delta\theta_R$ in Step S20 above can be performed based on the ratio of the knock determination signal Vk to the threshold $V_{TH}$.

On the other hand, if it is determined to be $Vk \leq 0$ in Step S19 (i.e., there is no knocking), the angle of retardation $\Delta\theta_R$ is set to zero in Step S21, and then Steps S22 and S23 are performed.

Next, the processing routine performed at the second reference crank position (e.g., 5 degrees BTDC) for calculating the threshold $V_{TH}$, which is used in Step S13, is described below.

First, in Step S14, a second integrated value $V_{R2}$ at the second reference crank position (e.g., 5 degrees BTDC) is calculated, and then in Step S15, the integrator 225 is reset by a reset signal R from the ECU 240. Thereafter, in Step S16, the second integrated value $V_{R2}$ is averaged by the filter 241 to provide an average value $V_A$ using the following formula:

$$V_A = (1-k) \times V_A^* + k \times V_{R2}$$

where k is a coefficient of contribution of the second integration value $V_{R2}$, and $V_A^*$ is the last average.

In Step S17, the calculator 243 amplifies the average value $V_A$ thus obtained and adds an offset value $V_{OF}$ thereto to provide a threshold $V_{TH}$ using the following formula:

$$V_{TH} = K \times V_A + V_{OF}$$

where K is a coefficient of amplification.

After the threshold $V_{TH}$ has been obtained in this manner, the ECU 240 generates a reset signal R to the integrator 225 and resets it in Step S18, thus terminating the threshold calculation routine.

In the above-described second embodiment, too, since the construction of the hardware components is substantially simplified and knock determination is carried out by the ECU 240, it becomes possible to perform knock determination for each cylinder at low cost and hence provide a knock control apparatus with a high degree of freedom and improved controllability.

Although in the second embodiment, the second integration value $V_{R2}$ at the second reference crank position (e.g., 5 degrees BTDC) is utilized for the calculation of the threshold $V_{TH}$ for the purpose of including only the BGL component while excluding any knock level component, the first integration value $V_{R1}$ at the first reference crank position (e.g., 75 degrees BTDC) may be available for such a calculation in place of the second integration value $V_{R2}$ without any practical problem since knocking will seldom occur under normal engine operating conditions.

What is claimed is:

1. A knock control apparatus for an internal combustion engine having at least one cylinder, comprising:
    a knock sensor for sensing knocking in said at least one cylinder;
    a signal processor for generating, based on the output signal of said knock sensor, a vibration level for a predetermined crank angle range from a reference crank position of said at least one cylinder;
    filter means for generating an average value of the vibration level;
    a calculator for calculating a knock determination threshold based on the average value of the vibration level;
    a comparator for comparing the vibration level with the knock determination threshold and generating a knock determination signal when the vibration level exceeds the knock determination threshold; and
    a knock controller for controlling, based on the knock determination signal, engine control parameters to suppress knocking in said at least one cylinder.

2. A knock control apparatus according to claim 1, wherein said filter means comprises:
    a first filter for averaging the vibration level to provide a first average value; and
    a second filter for averaging the first average value to provide a second average value.

3. A knock control apparatus according to claim 1, wherein said signal processor generates a first vibration level and a second vibration level at a first and a second reference crank position, respectively.

4. A knock control apparatus according to claim 3, wherein said calculator generates a threshold based on the second vibration level.

5. A knock control apparatus according to claim 4, wherein said comparator generates a knock determination signal based on a difference between the first vibration level and the threshold which is generated by said calculator based on the second vibration level.

6. A knock control method for suppressing knocking in an internal combustion engine having at least one cylinder, said method comprising the steps of:
    generating a vibration level representative of vibrations in said at least one cylinder of the engine;
    averaging the vibration level to provide an average value;
    generating a knock determination threshold based on the average value;
    comparing the vibration level with the knock determination threshold to determine whether knocking is taking place in said at least one cylinder, and generating a knock determination signal when said vibration level exceeds said knock determination threshold; and controlling engine control parameters to suppress knocking in said at least one cylinder when the vibration level exceeds the knock determination threshold.

7. A knock control method according to claim 6, wherein the step of averaging the vibration level to provide an average value comprises:

averaging the vibration level to provide a first average value; and averaging the first average value to provide a second average value.

8. A knock control method according to claim 6, wherein the step of generating a vibration level representative of vibrations of a cylinder of the engine comprises generating a first vibration level and a second vibration level at a first and a second reference crank position, respectively.

9. A knock control method according to claim 8, wherein the step of averaging the vibration level to provide an average value comprises generating a threshold based on the second vibration level.

10. A knock control method according to claim 9, wherein the step of generating a knock determination threshold based on the average value comprises generating a knock determination signal based on a difference between the first vibration level and the threshold which is generated based on the second vibration level.

11. A knock control apparatus according to claim 1, wherein said signal processor comprises a peak-hold circuit for generating a peak level signal representative of a peak level of the knock sensor output signal for the predetermined crank angle range.

12. A knock control apparatus according to claim 1, wherein said signal processor comprises an integrator for integrating the output signal of said knock sensor for the predetermined crank angle range.

13. A knock control apparatus according to claim 1, wherein said knock controller controls the engine control parameters such that when knocking is present in said at least one cylinder, said knock controller calculates an angle of retardation to suppress knocking in said at least one cylinder based on a ratio of said knock determination signal to said knock determination threshold.

14. A knock control method according to claim 6, wherein said controlling step is performed based on a ratio of said knock determination signal to said knock determination threshold.

* * * * *